Figure 1:
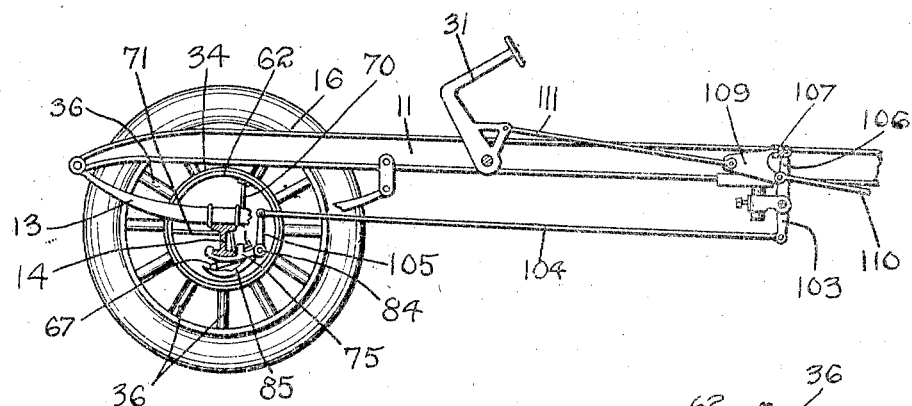

H. S. MORTON.
BRAKING MECHANISM.
APPLICATION FILED JULY 12, 1916. RENEWED DEC. 12, 1919.

1,334,711.

Patented Mar. 23, 1920.
2 SHEETS—SHEET 1.

Witnesses:
Alex. Fagaird
H. A. Bowman

Inventor:
Harold S. Morton
By F. U. Whiteley
his Attorney

H. S. MORTON.
BRAKING MECHANISM.
APPLICATION FILED JULY 12, 1916. RENEWED DEC. 12, 1919.

1,334,711.

Patented Mar. 23, 1920.
2 SHEETS—SHEET 2.

Witnesses:
Alex. Fagaard
H. A. Bowman

Inventor.
Harold S. Morton
By P. A. Whitley
his Attorney.

UNITED STATES PATENT OFFICE.

HAROLD S. MORTON, OF MINNEAPOLIS, MINNESOTA, ASSIGNOR TO MORTON BRAKE COMPANY, OF MINNEAPOLIS, MINNESOTA, A CORPORATION OF MINNESOTA.

BRAKING MECHANISM.

1,334,711.   Specification of Letters Patent.   Patented Mar. 23, 1920.

Application filed July 12, 1916, Serial No. 108,873. Renewed December 12, 1919. Serial No. 344,467.

*To all whom it may concern:*

Be it known that I, HAROLD S. MORTON, a citizen of the United States, residing at Minneapolis, in the county of Hennepin and State of Minnesota, have invented certain new and useful Improvements in Braking Mechanism, of which the following is a specification.

My invention relates to braking mechanism of the type which may readily be attached to the front or steering wheels of an automobile and which may be operated in conjunction with the brakes ordinarily used on the rear wheels in a four-wheel brake system such as is disclosed in my Patent Number 1,104,066, granted July 21, 1914. It is a particular object of my invention to provide a device of the above character which will be simple in construction, efficient in use and which can be attached to the front axle and the front or steering wheels of an existing automobile without drilling holes or altering any of the parts present in the automobile and without injury to the working efficiency of the parts or detriment to the appearance of the car.

The full objects and advantages of my invention will appear in connection with the detailed description thereof and are particularly pointed out in the claims.

In the drawings, illustrating the application of my invention in one form,—

Figure 2:
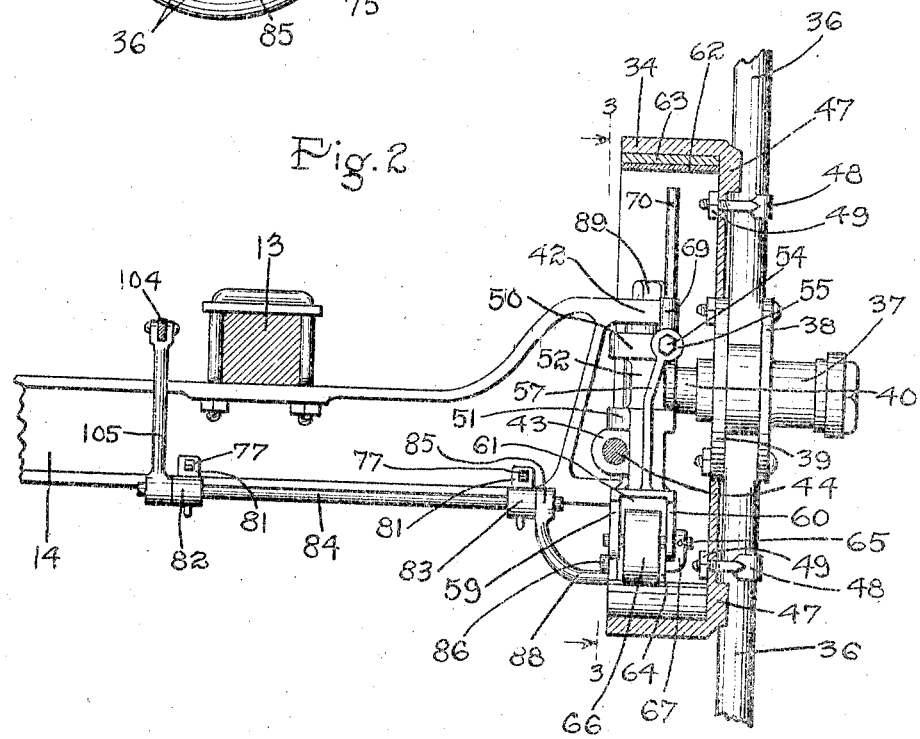
Figure 4:
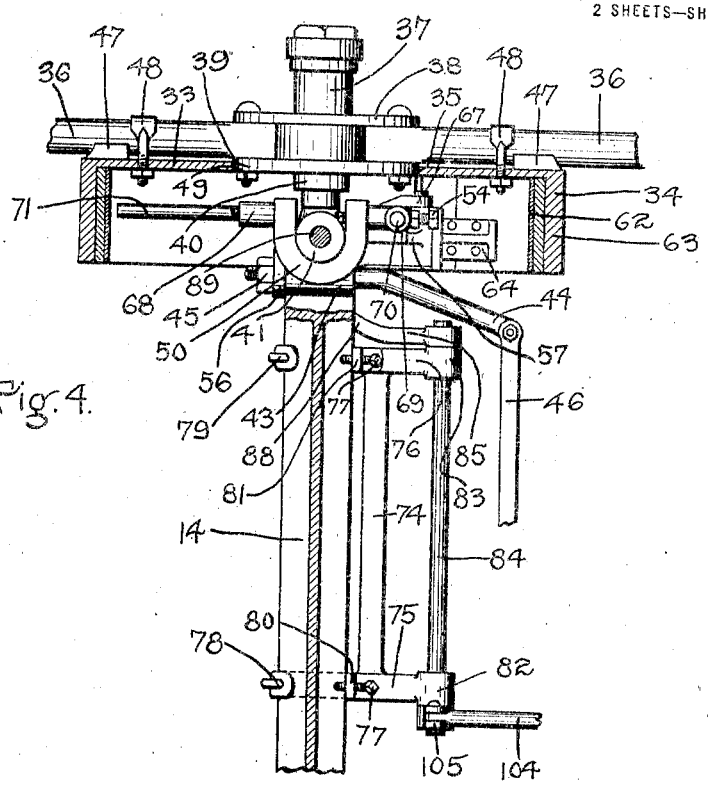
Figure 3:
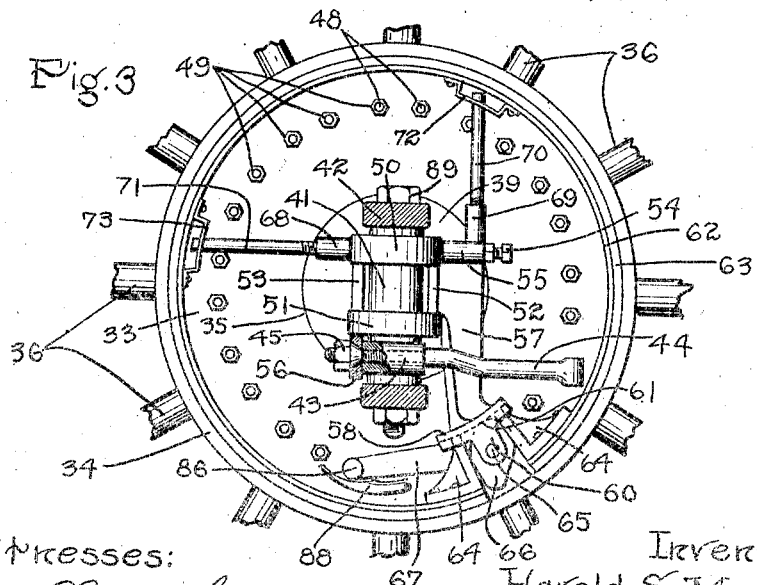

Figure 1 is a sectional elevation of a portion of an automobile chassis showing one of my braking devices applied to the front wheel. Fig. 2 is an enlarged elevation part in sectional view of a portion of the front axle and wheel showing the brake drum in position. Fig. 3 is a sectional view taken on line 3—3 of Fig. 2. Fig. 4 is a part sectional plan view of parts shown in Fig. 2.

Frame members 11 of an automobile are connected in the usual way through springs 13 with the front axle 14, which axle is supported by wheels 16 each having a multiplicity of wooden spokes 36 secured to a hub 37 by hub flanges 38 and 39, hub 37 being journaled on a stub shaft 40 having a vertical knuckle 41 pivoted to the forked portion 42 on the end of axle 14 by means of a trunnion 89. A lug 43 cast on the knuckle 41 has a shouldered rod 44 passing through it secured on the opposite side by a nut 45, which rod is pivotally connected with a corresponding rod on the opposite wheel by a link 46. The front wheels are thus secured to move in unison and are oscillated upon the trunnions 89 by steering mechanism of well-known construction. All of the above parts are, or may be, of the various common designs employed in the manufacture of automobiles.

The construction of the detachable brake mechanism embodies a drum 34 having a backing plate 33 with a central opening 35 of a size adapted to slip over the hub flange 39 and which is provided with a number of recessed blocks 47 formed integral with backing plate 33 which abut against the spokes 36 and receive the same within the recesses of said blocks. The drum is centered on the wheel by means of aperture 35 and is rigidly secured thereto by a number of U-bolts 48 which pass over said spokes and through the drum and are fastened on the inside by a number of nuts 49. The drum is thus very rigidly and accurately secured to the wheel 16 and not only has the effect of adding to the wheel a brake drum, as will hereinafter appear, without cutting, boring holes or in any way altering the wheel structure, but also very greatly strengthens the wheel because of the fact that the backing plate 33 engaging the spokes at a point between the hub and the felly of the wheel forms a substantial stiffening member.

Within the drum 34 a casting having two U-shaped members 50 and 51, connected by vertical bars 52 and 53, is adapted to slip over the steering knuckle 41 and be held in place by a set-screw 54 screwed into a boss 55 formed on member 50 beyond the center of the knuckle, and by means of the steering arm 44 which is adapted to pass through the lower end 56 of the bar 53 and have said bar secured thereto and to the lug 43 by means of the conical nut 45 previously mentioned. Through the agency of the nut 45 the lower portion of the casting is held from rotating or sliding longitudinally upon the knuckle 41, and by means of the set-screw 54 the hub portion is hence held in place, thus rigidly securing the casting to said knuckle, as will be hereafter pointed out. This casting provides an anchor for the brake band and serves to support a portion of the brake-actuating mechanism. An arm 57, which may be ribbed if desired, extends downwardly from bar 52 and the U-shaped members 50 and 51, preferably being formed integral therewith, and terminates in a head 58 having a segmental slot 61 concentric with the brake drum and axle and in a pair of lugs 59 and 60 formed on the side of said head. The brake band 62, preferably being of metal with a lining 63 attached thereto, lies within the drum 34 and has its adjacent ends provided with brackets 64 by means of which said band can be expanded to cause the lining to engage the inner surface of the brake drum. These brackets are of such a width and height that the extreme ends of them just fall within the slot 61, so that the band is securely held within the drum at that point and is still free to expand and contract as desired. A pin 65 pivotally mounted in the lugs 59 and 60 has rigidly secured to it between said lugs a double-faced cam 66 and an arm 67 on the end adjacent the inner portion of the brake drum 34. This cam, which is diamond-shaped, having the corners rounded off, is so positioned that when the arm 67 is oscillated upward the faces of said cam act between the brackets 64 and cause the brake band 62 to expand and engage the inner surface of the drum 34. In addition to the slot 61 for holding the brake band in place within the drum said band is supported in two other places, as best shown in Fig. 3. A pair of bosses 68 and 69, formed intergral with the U-shaped member 50, have rods 70 and 71 screwed into them which extend outward and pass through U-brackets 72 and 73 attached to the inner surface of the brake band 62. These brackets are provided with slotted apertures through which rods 70 and 71 extend, permitting the band to move circumferentially but holding it in place within the drum.

The devices for acting upon the arm or lever 67 are best shown in Figs. 2 and 4. A casting or bracket comprising a longitudinal bar 74 and transverse members 75 and 76 adapted to hook over the lower flange of the front axle at 78 and 79, is secured thereon by means of set-screws 77 which pass through lugs 80 and 81 formed on the upper surfaces of the members 75 and 76 and engage the top of said axle flange. This casting is provided with a pair of bearings 82 and 83 formed integral with the members 75 and 76 in which is journaled a short shaft 84. The inner end of shaft 84 has rigidly secured to it an arm 85 which is bent inward at 88 and engages a circular portion 86 of the arm 67 within the drum 34. Arm 85 falls below the arm 67, as clearly shown in Figs. 1 and 3 and engages the portion 86 of this arm substantially beneath the spindle 89 of the steering knuckle 41. The said portion 86 actually extends beyond the line of spindle 89 to allow the arm 67 to swing upward the maximum amount to clear the nut on the end of said spindle. As the wheel oscillates for steering, the lever 88 and the portion 86 of the lever 67 shift relatively to each other by sliding a small amount, though the same relative movement of the lever 88 will operate to set the brakes in all positions of the steering wheel. In this manner oscillation of the shaft 84 tends to set or relieve the brake equally well in all positions of the steering wheel.

It will be understood that a separate drum 34 is applied to each of the front steering wheels and that the operative parts herein referred to are duplicated for each of these steering drums. Each of the shafts 84 has fast thereon an arm 105 connected by links 104 with arms 103 fast on an equalizer shaft 98, which in turn has an arm 106 pivotally connected through equalizer mechanism 107, 109 and link 111 with the brake pedal 31. The link 111, pieces 109, 107, etc., take the place of the usual brake rod extending back to the rear brake wheels, a separate link 110 extending from piece 109 to the rear brake mechanism, not here shown.

The advantages of my invention will be apparent. It has been sufficiently established that what is known as "skidding" in automobiles is largely the result of the braking of the rear wheels only when the automobile has started to turn and the actual line of movement of the entire momentum of the automobile is at an angle to the free rolling movement of the wheels. When the rear wheels only are braked, so that they become stationary and slide, in skidding, that part of the machine follows the line of actual momentum while the front wheels being in free rolling contact continue to run off at an angle, thus resulting in the turning of the automobile and the loss of control thereof by the driver. When, however, all four wheels are braked this turning movement is entirely overcome. Not only will there be twice the braking efficiency for stopping the machine, but any skidding which may take place will take place uniformly throughout the length of the car and will not result in the turning of the automobile or in loss of control. With my present invention automobiles or other vehicles not ordinarily provided with brakes for all four wheels, or with front wheel brakes, may be so equipped without machining or altering the parts of the vehicle, and this may be done in a manner which does not interfere with the appearance of the car and actually adds to the strength of the front wheel structure.

I claim:

1. In combination with the front axle, a steering knuckle mounted for oscillation in a horizontal plane thereon and the front wheel of a vehicle, a brake drum attached to said wheel, a brake band within the drum, means including a depending arm attached to the steering knuckle and controlling said brake band, substantially radially positioned rods secured to said attached means and engaging the band for holding the same in operative position within the drum, and means operative upon said arm for setting the brake.

2. In combination with the front axle, a steering knuckle mounted for oscillation thereon, and the front wheel of a vehicle, a brake drum attached to said wheel, a brake band mounted within said drum, a member secured to the steering knuckle, a pin pivotally mounted in said member, a cam secured to said pin between the ends of said brake band, substantially radially positioned rods secured to said member and engaging said brake band for holding the same in operative position within the drum, an arm secured to said pivotally mounted pin, and means operative upon said arm for setting the brake.

3. In combination with the front axle, a steering knuckle mounted for oscillation in a horizontal plane thereon, and the front wheel of a vehicle, a brake drum attached to said wheel, a brake band mounted within said drum, a U-shaped member secured to the steering knuckle, an arm extending downwardly from said member, a pin pivotally mounted in the end of said arm, a cam secured to said pin, an enlarged portion on each end of said brake band, said portions lying adjacent opposite sides of said cam, slotted members secured to the inside of said brake band, substantially radially positioned rods secured at their inner ends to said U-shaped member and having their other ends extending through the slots of said slotted members, an arm secured to said pivotally mounted pin, and means operative upon said arm for setting the brake.

4. In combination with the front axle, a steering knuckle mounted for oscillation in a horizontal plane thereon, and the front wheel of a vehicle, a brake drum detachably secured to the spokes on the inner side of said wheel, a brake band mounted within said drum, a U-shaped member secured to the steering knuckle, an arm extending downwardly from said member terminating in a head having a segmental slot, lugs extending from said head, a pin pivotally mounted in said lugs, a cam secured to said pin between said lugs, an enlarged portion on each end of said brake band, said portions lying adjacent opposite sides of said cam and being guided in said slot, slotted members secured to the inside of said brake band, substantially radially positioned rods secured at their inner ends to said U-shaped member and having their outer ends extending through the slots of said slotted members, an arm secured to said pivotally mounted pin, and means operative upon said arm for setting the brake.

In testimony whereof I affix my signature in presence of two witnesses.

HAROLD S. MORTON.

Witnesses:
A. M. ROYAL,
H. A. BOWMAN.